United States Patent
Yoon et al.

(10) Patent No.: US 10,425,961 B2
(45) Date of Patent: Sep. 24, 2019

(54) NON-ORTHOGONAL TRANSMISSION METHOD AND APPARATUS IN COMMUNICATION SYSTEM

(71) Applicant: ELECTRONICS AND TELECOMMUNICATIONS RESEARCH INSTITUTE, Daejeon (KR)

(72) Inventors: Chan Ho Yoon, Daejeon (KR); Young Jo Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/819,792

(22) Filed: Nov. 21, 2017

(65) Prior Publication Data
US 2018/0146493 A1    May 24, 2018

(30) Foreign Application Priority Data

Nov. 24, 2016  (KR) .......................... 10-2016-0157758
Nov. 14, 2017  (KR) .......................... 10-2017-0151454

(51) Int. Cl.
*H04W 72/12*  (2009.01)
*H04W 72/02*  (2009.01)
(Continued)

(52) U.S. Cl.
CPC ....... *H04W 72/1268* (2013.01); *H04L 5/0044* (2013.01); *H04L 5/0051* (2013.01); *H04W 72/02* (2013.01); *H04W 72/1284* (2013.01); *H04W 74/08* (2013.01); *H04J 15/00* (2013.01); *H04L 5/0091* (2013.01)

(58) Field of Classification Search
CPC ............ H04W 72/1268; H04W 72/02; H04W 72/1284; H04W 74/08; H04W 72/0413; H04W 74/004; H04L 5/0044; H04L 5/0051; H04L 5/0091; H04L 5/0033; H04L 47/788; H04J 15/00
See application file for complete search history.

(56) References Cited

U.S. PATENT DOCUMENTS 8,942,166 B2   1/2015  Narasimha et al.
9,160,504 B2  10/2015  Qu
(Continued)

FOREIGN PATENT DOCUMENTS

WO    WO-2011/109796 A2    9/2011

OTHER PUBLICATIONS

Unjung Heo, "The BER Performance Improvement for IDMA Systems in Overloaded Environments", Korea Advanced Institute of Science and Technology, Master's Thesis, Department of Information and Communications Engineering, Advisor: Prof. Hyuncheol Park, Dec. 22, 2009.

*Primary Examiner* — Kibrom T Hailu
(74) *Attorney, Agent, or Firm* — Rabin & Berdo, P.C.

(57) ABSTRACT

A non-orthogonal transmission method of a terminal in a communication system may comprise generating data based on a signature used to identify the terminal among a plurality of terminals belonging to the communication system; generating an uplink signal including the data and a demodulation reference signal (DM-RS); and transmitting the uplink signal to a base station without an uplink grant.

19 Claims, 11 Drawing Sheets

(51) Int. Cl.
  *H04W 74/08* (2009.01)
  *H04L 5/00* (2006.01)
  *H04J 99/00* (2009.01)

(56) References Cited

U.S. PATENT DOCUMENTS

| | | | |
|---|---|---|---|
| 9,204,372 B2* | 12/2015 | Ahn | H04W 48/12 |
| 2011/0124357 A1 | 5/2011 | Kim et al. | |
| 2012/0157141 A1 | 6/2012 | Lim et al. | |
| 2014/0071936 A1* | 3/2014 | Zhang | H04L 25/0226 |
| | | | 370/330 |
| 2015/0223216 A1* | 8/2015 | Han | H04W 72/044 |
| | | | 370/329 |
| 2016/0065341 A1* | 3/2016 | Yoo | H04W 72/0446 |
| | | | 370/336 |
| 2016/0183309 A1 | 6/2016 | Zhang et al. | |
| 2017/0013610 A1 | 1/2017 | Lee et al. | |
| 2017/0215201 A1* | 7/2017 | Kim | H04L 27/26 |
| 2018/0070335 A1* | 3/2018 | Amuru | H04L 5/0044 |
| 2018/0084559 A1* | 3/2018 | Kim | H04B 7/26 |
| 2018/0302868 A1* | 10/2018 | Bhorkar | H04W 56/0005 |

* cited by examiner

FIG. 6A

$$\begin{bmatrix} 1 & 2 & 3 & 4 \\ 2 & 1 & 4 & 3 \\ 3 & 4 & 1 & 2 \\ 4 & 3 & 2 & 1 \end{bmatrix}$$

FIG. 6B

$$\begin{bmatrix} 1 & 2 & 3 & 4 \\ 2 & 4 & 1 & 3 \\ 3 & 1 & 4 & 2 \\ 4 & 3 & 2 & 1 \end{bmatrix}$$

FIG. 7A

$$\begin{bmatrix} 1 & 2 & 3 & 4 & 5 \\ 2 & 3 & 5 & 1 & 4 \\ 3 & 5 & 4 & 2 & 1 \\ 4 & 1 & 2 & 5 & 3 \\ 5 & 4 & 1 & 3 & 2 \end{bmatrix}$$

FIG. 7B

$$\begin{bmatrix} 1 & 2 & 3 & 4 & 5 \\ 2 & 4 & 1 & 5 & 3 \\ 3 & 5 & 4 & 2 & 1 \\ 4 & 1 & 5 & 3 & 2 \\ 5 & 3 & 2 & 1 & 4 \end{bmatrix}$$

NON-ORTHOGONAL TRANSMISSION METHOD AND APPARATUS IN COMMUNICATION SYSTEM

CROSS-REFERENCE TO RELATED APPLICATIONS

This application claims priorities to Korean Patent Applications No. 10-2016-0157758 filed on Nov. 24, 2016 and No. 10-2017-0151454 filed on Nov. 14, 2017 in the Korean Intellectual Property Office (KIPO), the entire contents of which are hereby incorporated by reference.

BACKGROUND

1. Technical Field

The present disclosure relates to a non-orthogonal transmission method for a communication system, and more specifically, to an uplink signal transmission method in a non-orthogonal transmission procedure.

2. Related Art

A communication system may comprise a core network (e.g., a serving gateway (S-GW), a packet data network (PDN) gateway (P-GW), a mobility management entity (MME), etc.), a base station (e.g. a macro base station, a small base station, a relay, etc.), a terminal, and the like. Communications between the base station and the terminal may be performed using various radio access technologies (RATS) such as 4G communication technology, 5G communication technology, wireless broadband technology (Wi-Bro), wireless local area network (WLAN), wireless personal area network (WPAN) technology, etc.

When uplink data exist in the terminal, the terminal may transmit a message requesting uplink transmission scheduling to the base station. Then, the base station may receive the message requesting uplink transmission scheduling from the terminal, and transmit an uplink grant to the terminal in response to the message. When the uplink grant is received from the base station, the terminal may transmit uplink data to the base station using a resource allocated by the base station.

When autonomous transmission (e.g., non-orthogonal transmission) is supported in a communication system, a terminal may transmit uplink data to a base station without an uplink grant. For example, the terminal may select a resource in a preconfigured resource pool and transmit uplink data to the base station using the selected resource. Here, the preconfigured resource pool may be shared by the base station and a plurality of terminals. Since the terminal does not know resources used by other terminals, the resource selected by the terminal from the preconfigured resource pool may be overlapped with the resources used by other terminals. In this case, a plurality of terminals may transmit uplink data using the same resource, thereby causing a transmission collision.

Also, a demodulation reference signal (DM-RS) may be used for estimating an uplink channel in the autonomous transmission procedure (e.g., a non-orthogonal transmission procedure). For example, the terminal may transmit an uplink signal including uplink data and DM-RS to the base station. The base station may estimate the uplink channel based on the DM-RS received from the terminal, and perform a decoding operation on the uplink signal based on the estimated uplink channel. However, when the same DM-RS is used by a plurality of terminals, the base station cannot obtain uplink data of each of the plurality of terminals because it cannot estimate an uplink channel of each of the plurality of terminals. Therefore, a method for resolving such the DM-RS collision problem in the autonomous transmission procedure is required.

SUMMARY

Accordingly, embodiments of the present disclosure provide a method and an apparatus for transmitting and receiving an uplink signal based on a signature of a terminal in a communication system.

In order to achieve the objective of the present disclosure, a non-orthogonal transmission method of a terminal in a communication system comprises generating data based on a signature used to identify the terminal among a plurality of terminals belonging to the communication system; generating an uplink signal including the data and a demodulation reference signal (DM-RS); and transmitting the uplink signal to a base station without an uplink grant.

Here, the signature is a cell-radio network temporary identifier (C-RNTI) configured by the base station.

Here, the data is interleaved using sequences configured based on the C-RNTI, and the sequences are four equal parts divided from the C-RNTI.

Here, the data is scrambled using a sequence configured based on the C-RNTI.

Here, a sequence of the DM-RS is determined based on the C-RNTI within a range determined based on a length of a Zadoff-Chu sequence and a number of DM-RS symbols spreaded in a subframe.

Here, a sequence of the DM-RS is a sequence indicated by a row which is selected randomly from a Latin square matrix, and the Latin square matrix includes a plurality of sequences different from each other.

Here, the plurality of terminal are classified into at least two groups, and the uplink signal further includes a group indicator indicating a group to which the terminal belongs.

Here, the group indicator is located at a predetermined interval in consecutive subframes used for transmission of the uplink signal.

Here, the group indicator is located in a first symbol of at least one subframe among consecutive subframes used for transmission of the uplink signal.

In order to achieve the objective of the present disclosure, an operation method of a base station in a communication system comprises receiving uplink signals from a plurality of terminals via a non-orthogonal resource without uplink grants; identifying each of demodulation reference signals (DM-RSs) included in the uplink signals based on a signature of each of the plurality of terminals; estimating an uplink channel of each of the plurality of terminals using each of the identified DM-RSs; and obtaining data of each of the plurality of terminals from the uplink signals based on the estimated uplink channel.

Here, the signature is a cell-radio network temporary identifier (C-RNTI) configured by the base station, and the data is obtained by performing a descrambling operation using a sequence configured based on the C-RNTI.

Here, the signature is a cell-radio network temporary identifier (C-RNTI) configured by the base station, the data is obtained by performing a deinterleaving operation using sequences configured based on the C-RNTI, and the sequences are four equal parts divided from the C-RNTI.

Here, the plurality of terminal are classified into at least two groups, and each of the uplink signals further includes a group indicator indicating a group to which each of the plurality of terminals belongs.

Here, the group indicator is located at a predetermined interval in consecutive subframes used for transmission of each of the uplink signals.

Here, the group indicator is located in a first symbol of at least one subframe among consecutive subframes used for transmission of each of the uplink signals.

In order to achieve the objective of the present disclosure, a terminal supporting a non-orthogonal transmission comprises a processor and a memory storing at least one instruction executed by the processor, wherein the at least one instruction is configured to: generate data based on a signature used to identify the terminal among a plurality of terminals belonging to the communication system; generate an uplink signal including the data and a demodulation reference signal (DM-RS); and transmit the uplink signal to a base station without an uplink grant.

Here, the signature is a cell-radio network temporary identifier (C-RNTI) configured by the base station, the data is interleaved using sequences configured based on the C-RNTI, and the sequences are four equal parts divided from the C-RNTI.

Here, the data is scrambled using a sequence configured based on the C-RNTI.

Here, the signature is a cell-radio network temporary identifier (C-RNTI) configured by the base station, and a sequence of the DM-RS is determined based on the C-RNTI within a range determined based on a length of a Zadoff-Chu sequence and a number of DM-RS symbols spreaded in a subframe.

Here, the plurality of terminal are classified into at least two groups, and the uplink signal further includes a group indicator indicating a group to which the terminal belongs.

According to embodiments of the present disclosure, the terminal can generate uplink data and DM-RS based on a signature of the terminal, and transmit an uplink signal including the uplink data and DM-RS to the base station. The base station can receive uplink signals (e.g., uplink data and DM-RSs) from a plurality of terminals, distinguish DM-RS of each of the plurality of terminals based on the signature of each of the plurality of terminals, and estimate an uplink channel of each of the plurality of terminals based on the distinguished DM-RS.

Also, the base station can distinguish the uplink data of each of the plurality of terminals based on the signature of each of the plurality of terminals, and perform a decoding operation on the uplink data of each of the plurality of terminals based on the estimated uplink channel. Therefore, a problem of collision between uplink signals (e.g., uplink data, DM-RSs) from the plurality of terminals in the autonomous transmission procedure (e.g., non-orthogonal transmission procedure) can be solved, and thus a performance of a communication system can be remarkably improved.

BRIEF DESCRIPTION OF DRAWINGS

Embodiments of the present disclosure will become more apparent by describing in detail embodiments of the present disclosure with reference to the accompanying drawings, in which:

FIGS. 6A and 6B are conceptual diagrams illustrating examples of 4×4 Latin square matrixes;

FIGS. 7A and 7B are conceptual diagrams illustrating examples of 5×5 Latin square matrixes;

DETAILED DESCRIPTION

Figure 1:
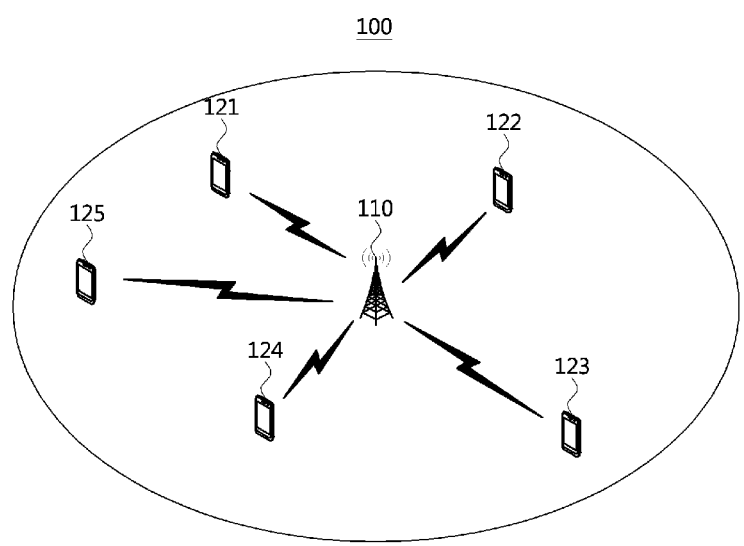
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a communication system.

Referring to FIG. 1, a communication system 100 may comprise a plurality of communication nodes 110, 121, 122, 123, 124, and 125. Also, the communication system 100 may comprise a core network (e.g., a serving gateway (S-GW), a packet data network (PDN) gateway (P-GW), a mobility management entity (MME), and the like). The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard.

For example, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol.

Meanwhile, each of the plurality of communication nodes may have the following structure.

Figure 2:
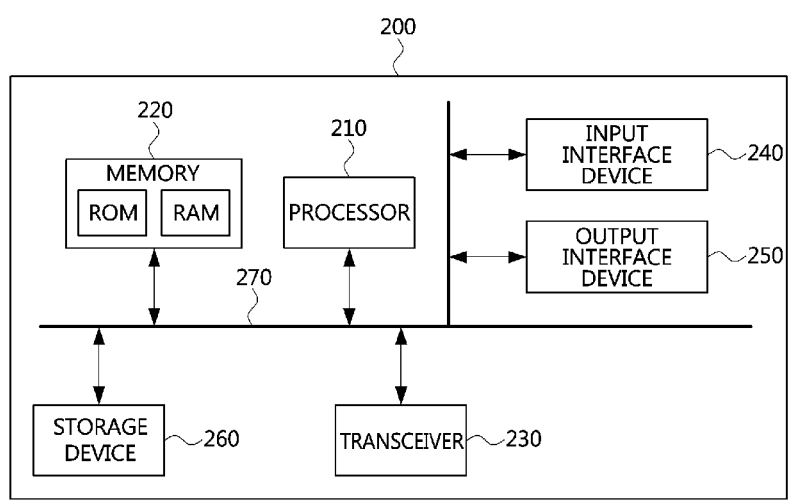
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, in the communication system 100, the base station 110 may form a macro cell or a small cell, and may be connected to the core network through an ideal backhaul or a non-ideal backhaul. The base station 110 may transmit signals received from the core network to the corresponding terminals 121, 122, 123, 124 and 125, and transmit signals received from the terminals 121, 122, 123, 124, and 125 to the core network. The plurality of terminals 121, 122, 123, 124, and 125 may belong to the cell coverage of the base station 110. The plurality of terminals 121, 122, 123, 124 and 125 may be connected to the base station 110 by performing a connection establishment procedure with the base station 110. The plurality of terminals 121, 122, 123, 124, and 125 may communicate with the base station 110 after being connected to the base station 110.

Also, the base station 110 may perform multiple-input multiple-output (MIMO) transmission (e.g., single user (SU) MIMO, multi user (MU) MIMO, massive MIMO etc.), coordinated multipoint (CoMP) transmission, carrier aggregation (CA) transmission, unlicensed band transmission, device-to-device communication (D2D) (or proximity services (ProSe)), and the like. Each of the plurality of terminals 121, 122, 123, 124, and 125 may perform an operation corresponding to the base station 110, an operation supported by the base station 110, and the like.

The base station 110 may also be referred to as a Node B, an evolved Node B (eNB), a base transceiver station (BTS), a radio remote head (RRH), a transmission reception point (TRP), a radio unit (RU), a roadside unit (RSU), a radio transceiver, an access point, an access node, or the like. Each of the plurality of terminals 121, 122, 123, 124 and 125 may also be referred to as a terminal, a user equipment (UE), an access terminal, a mobile terminal, a station, a subscriber station, a mobile station, a portable subscriber station, a node, a device, an on-broad unit (OBU), or the like.

Meanwhile, when autonomous transmission (e.g., non-orthogonal transmission) is supported in a communication system, a terminal may transmit uplink data to a base station without an uplink grant. For example, the terminal may select a resource in a preconfigured resource pool and transmit an uplink signal including uplink data and a reference signal to the base station using the selected resource. The reference signal may be used for estimating a channel between the base station and the terminal. For example, the reference signal may be a demodulation reference signal (DM-RS).

The preconfigured resource pool may be shared by the base station and a plurality of terminals. Since the terminal does not know resources used by other terminals, the resource selected by the terminal in the preconfigured resource pool may be overlapped with the resources used by the other terminals. In this case, a plurality of terminals may transmit uplink signals using the same resource, thereby causing a transmission collision. Also, since a plurality of terminal may use the same DM-RS, the base station may not estimate a channel for each of the plurality of terminals, and thus the base station may not decode the uplink signals of the respective terminals.

In the following description, embodiments for improving reception performance in a communication system supporting autonomous transmission (e.g., non-orthogonal transmission) will be described. The embodiments include a method for transmitting and receiving an uplink signal including data and DM-RS which are generated based on a signature of a terminal, a method for generating DM-RS based on a signature of a terminal, a method of transmitting and receiving based on a group indicator, and the like. In the embodiments described below, even if an operation (e.g., transmission or reception of a signal) performed at a first communication node among communication nodes is described, a corresponding second communication node may perform an operation (e.g., reception or transmission of the signal) corresponding to the operation at the first communication node. That is, when the operation of the terminal is described, the corresponding base station may perform an operation corresponding to the operation of the terminal. Conversely, when the operation of the base station is described, the corresponding terminal may perform an operation corresponding to the operation of the base station.

Figure 3:
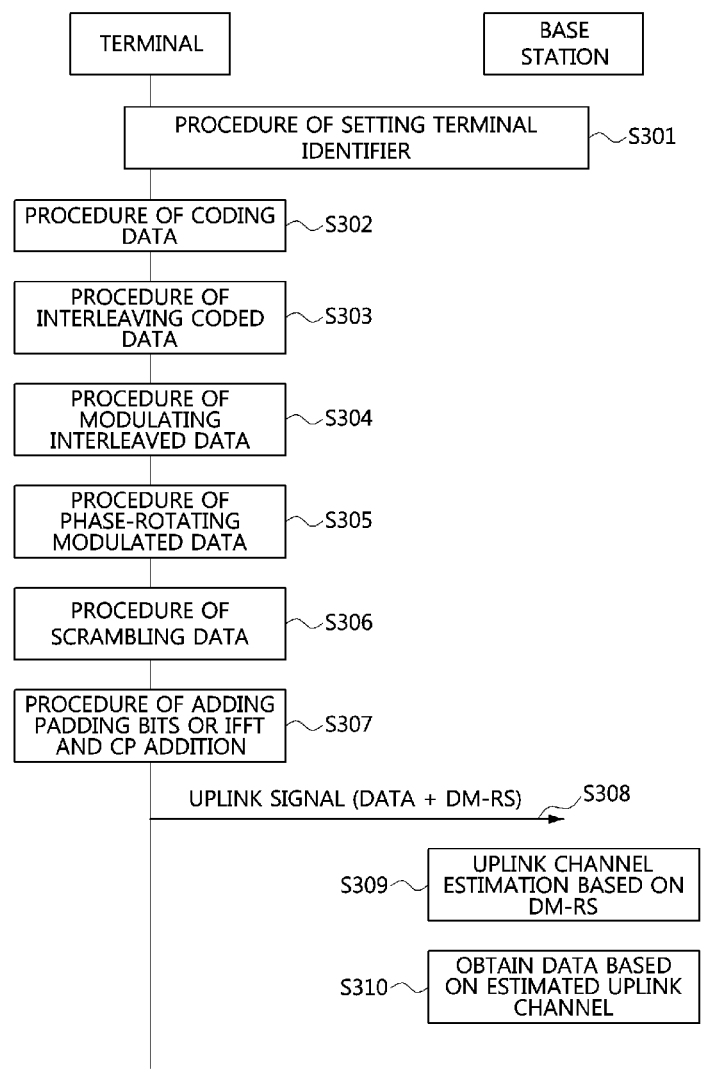
FIG. 3 is a sequence chart for explaining a first embodiment of an autonomous transmission based communication method.

FIG. 3 is a sequence chart for explaining a first embodiment of an autonomous transmission based communication method.

Referring to FIG. 3, a communication system may comprise a base station, a terminal, and the like, and may be configured to be the same as or similar to the communication system 100 shown in FIG. 1. Each of the base station and the terminal may support communications based on the autonomous transmission scheme, and may be configured to be the same as or similar to the communication node 200 shown in FIG. 2. First, a procedure of setting a terminal identifier between the base station and the terminal may be performed (S301). For example, the base station may transmit a synchronization signal (e.g., a primary synchronization signal (PSS) and a secondary synchronization signal (SSS)) and system information (e.g., a master information block (MIB) and at least one system information block (SIB)). Then, the terminal may receive the synchronization signal and the system information from the base station, and may confirm a downlink frame timing of the base station based on the received synchronization signal and the system information.

The terminal may estimate an uplink frame timing based on the downlink frame timing and transmit a random access preamble to the base station based on the estimated uplink frame timing. The base station may receive the random access preamble from the terminal, generate a random access response in response to the received random access preamble, and transmit the generated random access response to the terminal. That is, a random access procedure between the terminal and the base station may be performed, and the terminal may confirm the uplink frame timing of the base station through the random access procedure, and obtain the terminal identifier. The terminal identifier may be a cell-radio network temporary identifier (C-RNTI) used to identify the terminal, and the C-RNTI may be composed of n bits. Here, n may be a positive integer. In the autonomous transmission based communication method, the C-RNTI may be used as a signature of the terminal. For example, an interleaving procedure and a scrambling procedure may be performed based on the C-RNTI, and a DM-RS may be generated based on the C-RNTI.

Meanwhile, if there is data to be transmitted to the base station (i.e., uplink data), the terminal may perform uplink transmission without an uplink grant from the base station. The terminal may perform the uplink transmission based on a single-carrier scheme or a multi-carrier scheme. A terminal that performs uplink transmission based on the single-carrier scheme may be configured as follows.

Figure 4:
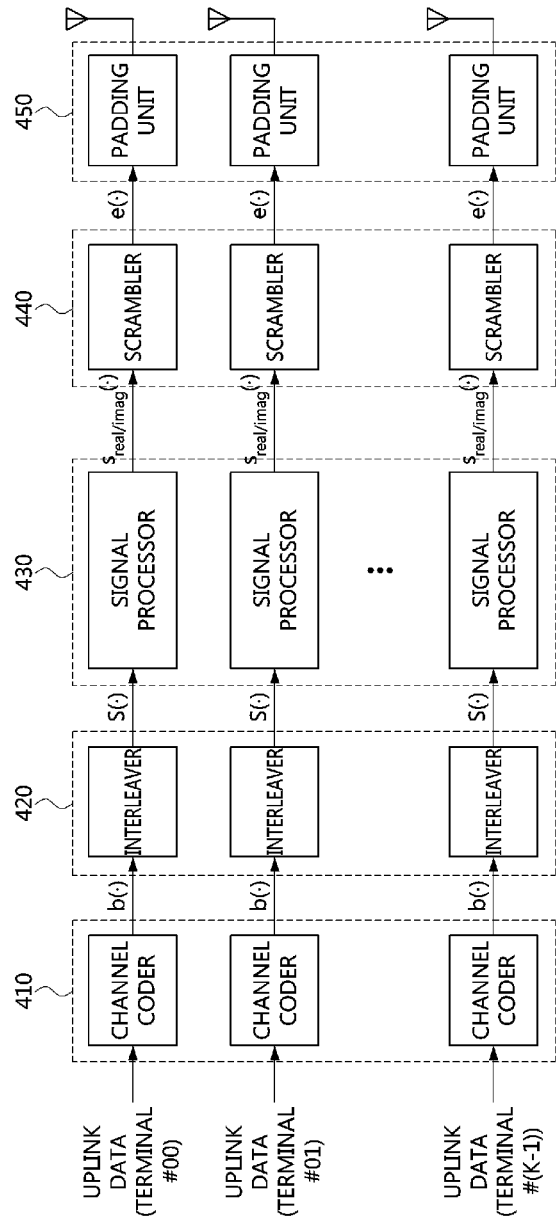
FIG. 4 is a block diagram illustrating a first embodiment of a terminal supporting a single-carrier scheme.

FIG. 4 is a block diagram illustrating a first embodiment of a terminal supporting a single-carrier scheme.

Referring to FIG. 4, each of terminals (e.g., a terminal #00, a terminal #01, . . . , a terminal #(k−1)) may comprise a channel coder 410, an interleaver 420, a signal processor 430, a scrambler 440, a padding unit 450, and the like. The channel coder 410 may perform coding on the data. The coded data may contain data having redundancy, and a coding rate thereof may be 1/24. The interleaver 420 may perform interleaving on the coded data. A unique signature of the terminal may be inserted into the coded data in the interleaving procedure. The signal processor 430 may perform a modulation function, a phase rotation function, a reference signal (RS) addition function, and the like. The scrambler 440 may perform scrambling on the signal obtained from the signal processor 430. The padding unit 450 may add zero padding to the signal obtained from the scrambler 440.

Meanwhile, a terminal that performs uplink transmission based on the multi-carrier scheme may be configured as follows.

Figure 5:
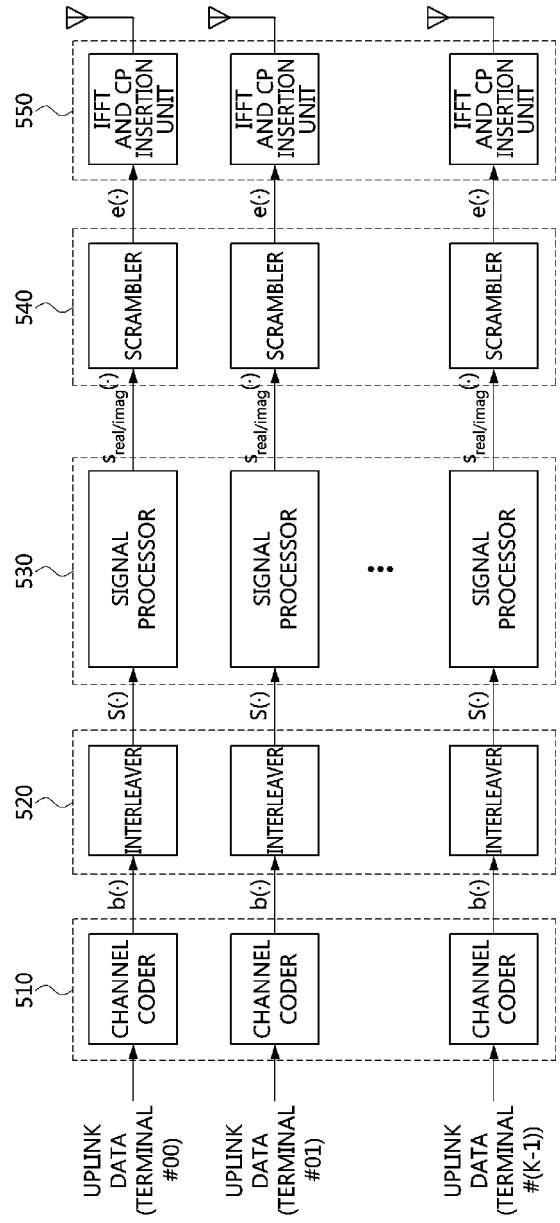
FIG. 5 is a block diagram illustrating a first embodiment of a terminal supporting a multi-carrier scheme.

FIG. 5 is a block diagram illustrating a first embodiment of a terminal supporting a multi-carrier scheme.

Referring to FIG. 5, each of terminals (e.g., a terminal #00, a terminal #01, . . . , a terminal #(k−1))) may comprise a channel coder 510, an interleaver 520, a signal processor 530, a scrambler 540, an inverse fast Fourier transform (IFFT) and a cyclic prefix (CP) insertion unit 550, and the like. The functions of the channel coder 510, the interleaver 520, the signal processor 530 and the scrambler 540 are the same as those of the channel coder 410, the interleaver 420, the signal processor 430 and the scrambler 440 shown in FIG. 4. The terminal supporting the multi-carrier scheme may include the IFFT and CP insertion unit 550 instead of the padding unit 450. The IFFT and CP insertion unit 550 may perform an IFFT operation on the signal obtained from the scrambler 540 and insert a CP into the signal on which the IFFT operation has been performed.

Referring back to FIG. 3, the terminal may perform coding on data to be transmitted (S302). The coding procedure may be performed by the channel coder 410 shown in FIG. 4 or the channel coder 510 shown in FIG. 5, and the coded data may be expressed as 'b(•)'. The channel coders 410 and 510 may transmit the coded data to the interleavers 420 and 520, respectively.

The terminal may insert a signature (e. g., the unique signature of the terminal) in the coded data. For example, the terminal may perform interleaving on the coded data based on the terminal identifier (S303). An interleaving sequence based on the terminal identifier may be used in the interleaving procedure, and thus the interleaved data may include the terminal's unique signature. The interleaving procedure may be performed by the interleaver 420 shown in FIG. 4 or the interleaver 520 shown in FIG. 5, and the interleaved data may be expressed as 's(•)'. The interleavers 420 and 520 of the terminal may generate 's(•)' based on Equation 1 below.

$$s_0((a_3+i) \bmod L_{itlv}) = b(i), i = \lfloor z \bmod L_{itlv} \rfloor$$

$$s_1((L_{itlv}/2) \cdot (i \bmod 2) + \in i/2 \rfloor) = s_0(i), z = 0, 1, 2, \ldots, D-1$$

$$s_2((a_2+i) \bmod L_{itlv}) = s_1(i), m = 0, 1, 2, \ldots, D/16-1$$

$$s_3(2 \cdot \lfloor i/2 \rfloor + (i + L_{itlv} - \lfloor 2 \cdot i \rfloor) \bmod 2) = s_2(i),$$

$$s_4((a_1+i) \bmod L_{itlv}) = s_3(i),$$

$$s_5(i) = s_4((L_{itlv}/4) \cdot (i \bmod 4) + \lfloor i/4 \rfloor),$$

$$s_6((a_0+i) \bmod L_{itlv}) = s_5(i),$$

$$s_{real}(16 \cdot m + i) = s_6(v_{real}(i)),$$

$$s_{imag}(16 \cdot m + i) = s_6(v_{imag}(i)),$$

$$v_{real}(i) = \{21, 15, 2, 13, 27, 14, 11, 5, 17, 8, 31, 3, 29, 22, 10, 19\}$$

$$v_{imag}(i) = \{12, 9, 6, 24, 16, 23, 18, 7, 26, 30, 4, 0, 25, 20, 1, 28\} \quad [\text{Equation 1}]$$

Here, 'b(•)' may indicate outputs of the channel coders 410 and 510, D may indicate the length of b(•) (e.g., the number of bits), and $L_{itlv}$ may indicate the length of the interleaver. Also, m may be configured to be one-sixteenth of D, and a sequence of m may be configured using a row which is randomly selected from a Latin square matrix.

The features of a Latin square matrix having an N×N size (hereinafter referred to as 'N×N Latin square matrix') may be as follows. Here, N may be an integer of 1 or more.

Feature 1: Elements that make up each row of the Latin square matrix may have a value of 0, 1, . . . , and (N−1), and elements in the same row of the Latin square matrix may have different values. For example, in the same row of the Latin square matrix, each of 0, 1, . . . , and (N−1) may be present once.

Feature 2: Elements constituting each column of the Latin square matrix may have a value of 0, 1, . . . , and (N−1), and elements in the same column of the Latin square matrix may have different values. For example, in the same column of a Latin square matrix, each of 0, 1, . . . , and (N−1) may be present once.

Feature 3: When comparing two rows in a Latin square matrix, the elements in the same column in two rows may have different values.

Feature 4: When comparing two columns in a Latin square, the elements in the same row in two columns may have different values.

When a cyclic shift is performed on the columns other than the first column in a symmetric N×N Latin square matrix having a natural order, matrices having a size of N×N may be generated. Since one matrix may be generated each time a cyclic shift is performed, (N−2) matrices may be additionally generated by performing cyclic shifts. The matrices generated by the cyclic shift may have the features of the Latin square matrix described above. For example, the matrices generated by the cyclic shift may also be a Latin square matrix. Accordingly, the total number of Latin square matrices may be (N−1).

(N−1) Latin square matrices may additionally have the following features.

Feature 5: When comparing two rows in different Latin square matrices, values of elements may be the same in only one column of N columns of the two rows.

Feature 6: When comparing two columns in different Latin square matrices, values of elements may be the same in only one row of N rows of the two columns. N×(N−1) rows may be obtained from (N−1) Latin square matrices, and when two rows among the N×(N−1) rows are compared, a case that values of elements in the same column are the same occurs only once.

In case that N=4, the Latin square matrix may be as follows.

FIGS. 6A and 6B are conceptual diagrams illustrating examples of 4×4 Latin square matrixes.

Referring to FIGS. 6A and 6B, two Latin square matrixes satisfy the above-described features 1 to 6. In case that D of Equation 1 is 64, the sequence of m may be set using a row belonging to the Latin square matrix in FIG. 6A or 6B. For example, the sequence of m may be set using the second row [2, 1, 4, 3] of the Latin square matrix in FIG. 6A. If m=[1, 2, 3, 4], a movement interval between a specific value in b(•) and a specific value in s(•) may be equal to or less than 16 bits.

In case that N=5, the Latin square matrix may be as follows.

FIGS. 7A and 7B are conceptual diagrams illustrating examples of 5×5 Latin square matrixes.

Referring to FIGS. 7A and 7B, two Latin square matrixes satisfy the above-described features 1 to 6. In case that D of Equation 1 is 80, the sequence of m may be set using a row belonging to the Latin square matrix in FIG. 7A or 7B. For example, the sequence of m may be set using the second row [2, 3, 5, 1, 4] of the Latin square matrix in FIG. 7A. If m=[1, 2, 3, 4, 5], a movement interval between a specific value in b(•) and a specific value in s(•) may be equal to or less than 32 bits.

Referring again to FIG. 3, $a_0$, $a_1$, $a_2$, and $a_3$ in Equation 1 may be obtained from the terminal identifier (e.g., C-RNTI) obtained in the step S301. For example, the terminal may obtain $a_0$, $a_1$, $a_2$, and $a_3$ based on Equation 2 below.

$$\begin{aligned} RNTI_{cell} &= [1\ 0\ 1\ 1\ 0\ 0\ 1\ 1\ 0\ 0\ 0\ 1\ 0\ 1\ 0\ 0] \\ &= \begin{bmatrix} [1\ 0\ 1\ 1][0\ 0\ 1\ 1] \\ [0\ 0\ 0\ 1][0\ 1\ 0\ 0] \end{bmatrix} \\ &= [a_0\ a_1\ a_2\ a_3] \end{aligned} \quad [\text{Equation 2}]$$

$RNTI_{cell}$ may be the terminal identifier obtained in the step S301, $a_0$ may be [1 0 1 1], $a_1$ may be [0 0 1 1], $a_2$ may be [0 0 0 1], and $a_3$ may be [0 1 0 0]. That is, the terminal may divide the C-RNTI into four equal parts, each of which may be changed to a decimal number. The decimal numbers of the four equal parts may be designated as $a_0$, $a_1$, $a_2$, and $a_3$. The range of each of $a_0$, $a_1$, $a_2$, and $a_3$ may be 0 to 15. Alternatively, the range of each of $a_0$, $a_1$, $a_2$, and $a_3$ may be limited to 0 to 2, in which case the number of $s_{real}(i)$ and $s_{imag}(i)$ may be limited.

In Equation 1, D may be a multiple of $L_{itlv}$. In case that D is not a multiple of $L_{itlv}$, the terminal may determine $n_{padding}$ based on Equation 3 below. $n_{padding}$ may be the number of padding bits (e.g., a sequence composed of zeros). That is, $n_{padding}$ with a length shorter than $L_{itlv}$ may be added to D. Thus, interleaving may be performed for each binary bit vector unit of the outputs (e.g., b(•)) of the channel coders 410 and 510.

$$((D + n_{padding}) \bmod L_{itlv}) = 0 \quad [\text{Equation 3}]$$

Meanwhile, when the interleaving procedure is completed, the terminal may perform modulation on the interleaved data (e.g., $s_6$ in Equation 1) (S304). When the modulation procedure is completed, the terminal may perform phase rotation on the modulated data (S305). The modulation procedure and the phase rotation procedure may be performed by the signal processor 430 shown in FIG. 4 or the signal processor 530 shown in FIG. 5.

When the modulation procedure and the phase rotation procedure are completed, the terminal may perform scrambling on the data (S306). The scrambling procedure may be performed by the scrambler 440 shown in FIG. 4 or the scrambler 540 shown in FIG. 5. For example, the scramblers 440 and 540 may perform scrambling on the data (e.g., $s_{real}(i)$ and $s_{imag}(i)$) obtained from the signal processors 430 and 530, and the scrambled data may be expressed as 'e(•)'. For example, the terminal may perform bit-level scrambling based on Equation 4 below.

$$e_{real}(i)=(s_{real}(i)+c(i)_{RNTI_{cell}}) \bmod 2, i=0,1,\ldots,D/2-1$$

$$e_{imag}(i)=(s_{imag}(i)+c(i)_{RNTI_{cell}}) \bmod 2 \quad \text{[Equation 4]}$$

Here, $e_{real}(i)$ and $e_{imag}(i)$ may be the scrambled data, and D may indicate the length of b(•) (e.g., the number of bits). $c(i)_{RNTI_{cell}}$ may be generated based on Equation 5 below.

$$c(i)_{RNTI_{cell}}=(x_1(i+50)+x_2(i+50)) \bmod 2$$

$$x_1(i+31)=(x_1(i+3)+x_1(i)) \bmod 2$$

$$x_2(i+31)=(x_2(i+3)+x_2(i+2)+x_2(i+1)+x_2(i)) \bmod 2, i=0,1,2,\ldots,D-1 \quad \text{[Equation 5]}$$

An initial shift register value of $x_1(•)$ may be $x_1(0)=1$ {$x_1(k)=0$, $k=1, 2, \ldots, 30$}. Also, an initial shift register value of $x_2(•)$ may be determined based on Equation 6 below.

$$\Sigma_{k=0}^{15} RNTI_{cell}(k) \cdot 2^k = \Sigma_{k=0}^{k=0} x_2(k) \cdot 2^k \quad \text{[Equation 6]}$$

Meanwhile, when the scrambling procedure is completed, the terminal may perform an operation of adding padding bits to the scrambled data (i.e., e(•)) or the IFFT and CP insertion operation on the scrambled data (S307). For example, the padding unit 450 of FIG. 4 may add padding bits to the scrambled data, or the IFFT and CP insertion unit 550 of the terminal shown in FIG. 5 may perform the IFFT operation on the scrambled data and insert the CP into the IFFT operation completed data.

Meanwhile, the terminal may generate an uplink signal including data (e.g., data generated by the steps S302 to S307 in FIG. 3) and DM-RS. The terminal may generate the DM-RS using a unique signature (e.g., the terminal identifier obtained in step S301 of FIG. 3). For example, a sequence number u of the DM-RS may be set based on Equation 7 below.

$$u=(4096 \cdot a_3 + 256 \cdot a_2 + 16 \cdot a_1 + a_0) \bmod (N_{SF} \cdot N_{ZC}^{RS}) \quad \text{[Equation 7]}$$

Here, $a_0$, $a_1$, $a_2$, and $a_3$ may be derived based on Equation 2, $N_{ZC}^{RC}$ may indicate a Zadoff-Chu (ZC) sequence length, and $N_{SF}$ may indicate the number of DM-RS symbols spreaded in a subframe. The DM-RS symbols may refer to symbols used for transmitting the DM-RS. In the frequency domain, a sequence of the DM-RS (i.e., $x_q(m)$) may be generated based on Equation 8 below.

$$x_q(m) = e^{j\frac{\pi v}{3}} e^{j\frac{\pi q m(m+1)}{N_{ZC}^{RS}}}, 0 \le m \le N_{ZC}^{RS} - 1 \quad \text{[Equation 8]}$$

$$q = \lfloor v/3 + \lfloor RNTI_{cell} \bmod N_{ZC}^{RS} \rfloor \rfloor \bmod N_{ZC}^{RS}$$

Here, q may indicate a root value of $N_{ZC}^{RS}$, and v may be a cell-specific variable. For example, v may be set to one of 0, 1, and 2. $N_{ZC}^{RS}$ and $RNTI_{cell}$ may be set by the base station, and the $RNTI_{cell}$ may be the identifier (e.g., one of 0 to 503) of the base station. $N_{SF} \cdot N_{ZC}^{RS}$ sequences $r_{u,i}(n)$ for the non-orthogonal based DM-RS may be generated based on Equation 9 below.

$$r_{u,i}(n)=w_i(\lfloor n/N_{ZC}^{RS} \rfloor) \cdot x_q((u+n) \bmod N_{ZC}^{RS}),$$
$$0 \le n < N_{SF} N_{ZC}^{RS} - 1$$

$$i = \lfloor u/N_{ZC}^{RS} \rfloor$$

$$l=0, n=0,1,2\ldots,N_{ZC}^{RS}-1$$

$$l=1, n=N_{ZC}^{RS}, N_{ZC}^{RS}+1, N_{ZC}^{RS}+2\ldots,2N_{ZC}^{RS}-1$$

$$l=2, n=2N_{ZC}^{RS}, 2N_{ZC}^{RS}+1, 2N_{ZC}^{RS}+2\ldots,3N_{ZC}^{RS}-1$$

$$l=3, n=3N_{ZC}^{RS}, 3N_{ZC}^{RS}+1, 3N_{ZC}^{RS}+2\ldots,4N_{ZC}^{RS}-1 \quad \text{[Equation 9]}$$

Here, the u may be a value (e.g., the sequence number of the DM-RS of the terminal) which is calculated based on the equation 7. In case that $N_{ZC}^{RS}=11$ and $N_{SF}=4$, 44 sequences ($r_{u,i}(n)$) having the length of 11 may be generated. That is, $r_{u,i}(n)$ may be defined from $r_0(n)$ to $r_{43}(n)$. In case that $N_{SF}=4$, orthogonal sequences ($w_i$) may be defined as Table 1 below.

[Table 1]

TABLE 1

| $w_i$ | [$w_i(0), \ldots, w_i(N_{SF}-1)$] |
|---|---|
| i = 0 | [1 1 1 1] |
| i = 1 | [1 −1 1 −1] |
| i = 2 | [1 1 −1 −1] |
| i = 3 | [1 −1 −1 1] |

In case that the DM-RS symbols spreaded by an orthogonal sequence of Table 1 (e.g., an orthogonal cover code (OCC)) are four, four symbols included in a subframe may be used as the DM-RS symbols.

Figure 8:
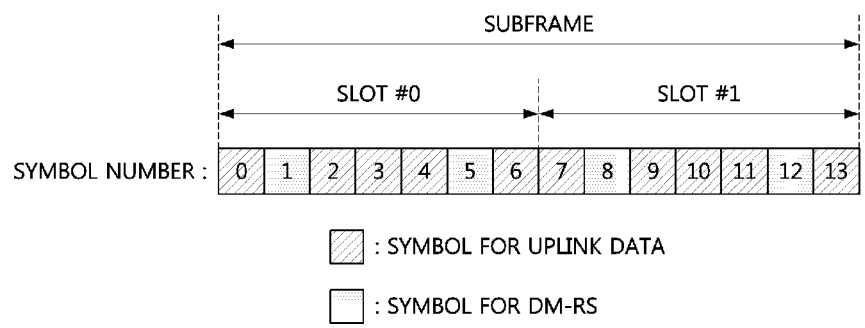
FIG. 8 is a conceptual diagram illustrating positions of DM-RS symbols in a subframe.

FIG. 8 is a conceptual diagram illustrating positions of DM-RS symbols in a subframe.

Referring to FIG. 8, a subframe may include two slots, and each of the slots may include seven symbols. The subframe may be a subframe defined in an LTE based communication system. For example, the length of the subframe may be 1 ms, and the length of each of the slots included in the subframe may be 0.5 ms. Among the 14 symbols included in the subframe, four symbols may be used for transmission of the DM-RS. For example, symbols #1, #5, #8, and #12 may be used as DM-RS symbols.

In case that $N_{ZC}^{RS}=11$ and $N_{SF}=4$, estimation operations for up to 44 uplink channels may be performed simultaneously. According to Equation 9, 44 uplink signals (e.g., non-orthogonal uplink signals) including different DM-RSs in one group may be transmitted simultaneously. Accordingly, the base station may estimate the 44 uplink channels using the different DM-RSs, and distinguish the 44 uplink signals based on the estimated uplink channels.

Meanwhile, when the terminal transmits an uplink signal through consecutive subframes, DM-RS sequence numbers of the DM-RSs included in the uplink signal may be configured as follows.

Figure 9:
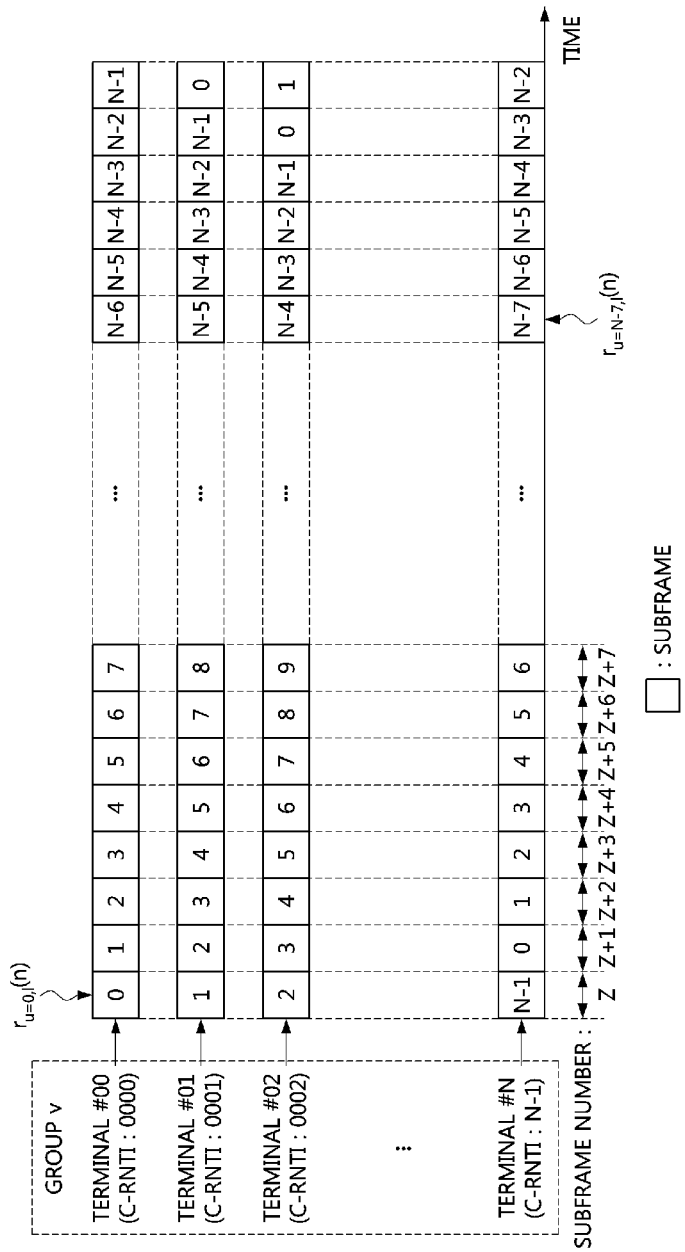
FIG. 9 is a conceptual diagram illustrating a first embodiment of configuration of DM-RS sequences when consecutive subframes are used for transmission of an uplink signal.

FIG. 9 is a conceptual diagram illustrating a first embodiment of configuration of DM-RS sequences when consecutive subframes are used for transmission of an uplink signal.

Referring to FIG. 9, a group v may include N (e.g., $N_{SF} \cdot N_{ZC}^{RS}$) terminals, a C-RNTI of a terminal #00 may be set to '0000', a C-RNTI of a terminal #01 may be set to '0001', a C-RNTI of a terminal #02 may be set to '0002', and a C-RNTI of a terminal #N may be set to (N−1). Also, z may indicate a subframe number (e.g., a subframe index), and u may indicate a terminal number (e.g., a terminal index).

Each of 0, 1, 2, 3, 4, 5, 6, 7, 8, 9, . . . , N−7, N−6, N−5, N−4, N−3, N−2, and N−1 may indicate DM-RS sequence numbers of the DM-RSs used in the corresponding subframe. The DM-RS sequence numbers of the DM-RSs may be changed according to the subframe. For example, the DM-RS sequence number of the DM-RS may increase as the subframe number increases. Accordingly, the terminals belonging to the same group (e.g., the group v) may use different DM-RSs at the same time (e.g., in the same subframe).

Figure 10:
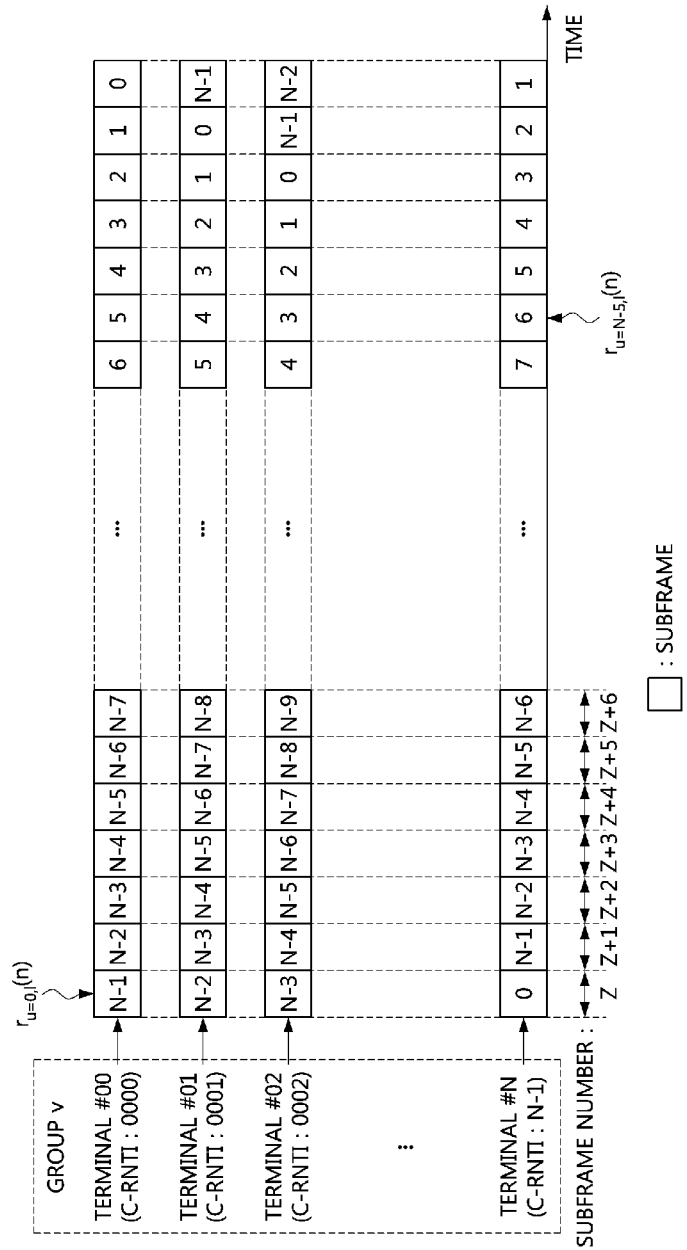
FIG. 10 is a conceptual diagram illustrating a second embodiment of configuration of DM-RS sequences when consecutive subframes are used for transmission of an uplink signal.

FIG. 10 is a conceptual diagram illustrating a second embodiment of configuration of DM-RS sequences when consecutive subframes are used for transmission of an uplink signal.

Referring to FIG. 10, a group v may include N (e.g., $N_{SF} \cdot N_{ZC}^{RS}$) terminals, a C-RNTI of a terminal #00 may be set to '0000', a C-RNTI of a terminal #01 may be set to '0001', a C-RNTI of a terminal #02 may be set to '0002', and a C-RNTI of a terminal #N may be set to (N−1). Also, z may indicate a subframe number (e.g., a subframe index), and u may indicate a terminal number (e.g., a terminal index).

Each of 0, 1, 2, 3, 4, 5, 6, 7, 8, 9, . . . , N−7, N−6, N−5, N−4, N−3, N−2, and N−1 may indicate DM-RS sequence numbers of the DM-RSs used in the corresponding subframe. The DM-RS sequence numbers of the DM-RSs may be changed according to the subframe. For example, the DM-RS sequence number of the DM-RS may decrease as the subframe number increases. Accordingly, the terminals belonging to the same group (e.g., the group v) may use different DM-RSs at the same time (e.g., in the same subframe).

Meanwhile, in case that the base station does not inform the terminal of a start time and an end time of uplink transmission, the terminal may perform the uplink transmission at an arbitrary point in time. For example, the terminal may select a time to perform the uplink transmission, identify a DM-RS sequence number based on a subframe number corresponding to the selected time, and transmit an uplink signal including data and a DM-RS corresponding to the identified DM-RS sequence number at the selected time. In this case, the terminal may inform the base station of the start time and the end time of the uplink transmission selected by the terminal.

The DM-RS sequence numbers of the DM-RS that change with time may be configured based on the Latin square matrix. In the Latin square matrixes shown in FIGS. 6A, 6B, 7A, and 7B, a column may indicate a time (e.g., a subframe), and a row may be used for selecting DM-RS sequence numbers of DM-RSs for a terminal. For example, if one group includes five terminals and the length of the DM-RS sequence is 5, the sequence numbers of the DM-RSs for the five terminals may be configured based on the Latin square matrix shown in FIG. 7A or 7B. In this case, orthogonality between the DM-RSs in one group can be maintained.

In the case that the DM-RSs are configured based on the Latin square matrix, the demodulation performance in the receiver can be improved by interference randomization characteristics. For example, since the DM-RS of the terminal belonging to a group A collides with DM-RSs of multiple terminals belonging to a group B rather than a single terminal, interference randomization may occur. In this case, the base station can estimate a channel for an interval in which the interference occurs based on a DM-RS obtained in an interval in which the interference does not occur.

Figure 11:
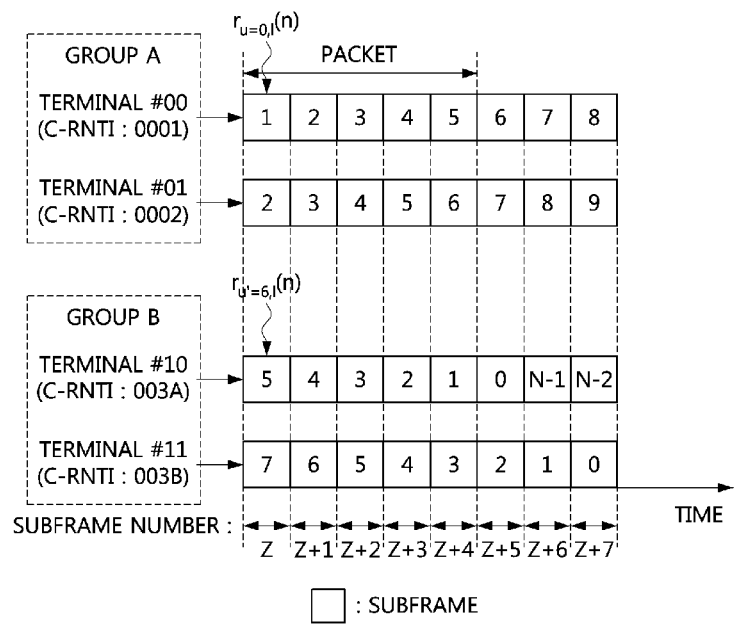
FIG. 11 is a conceptual diagram illustrating a scenario in which a collision of DM-RSs occurs.

FIG. 11 is a conceptual diagram illustrating a scenario in which a collision of DM-RSs occurs.

Referring to FIG. 11, terminals (e.g., a terminal #00, a terminal #01, a terminal #10, and a terminal #11) may transmit uplink signals (e.g., packet) using subframes #z to #(z+4). The DM-RS sequence numbers used by the terminals in the subframes #z to #(z+4) may be as shown in Table 2 below.

TABLE 2

| Group | Terminal Number | Identifier (C-RNTI) | DM-RS sequence number | | | | |
|---|---|---|---|---|---|---|---|
| | | | z | z + 1 | z + 2 | z + 3 | z + 4 |
| A | 00 | 0001 | 1 | 2 | 3 | 4 | 5 |
| | 01 | 0002 | 2 | 3 | 4 | 5 | 6 |
| B | 10 | 003A | 5 | 4 | 3 | 2 | 1 |
| | 11 | 003B | 7 | 6 | 5 | 4 | 3 |

The DM-RS of the terminal #00 may collide with the DM-RS of the terminal #10 in the subframe #(z+2), and the DM-RS of the terminal #00 may collide with the DM-RS of the terminal #11 in the subframe #(z+3). That is, since the DM-RS of the terminal #00 collides with the DM-RSs of different terminals, the effect of interference randomization may occur.

Referring again to FIG. 3, the terminal may transmit to the base station an uplink signal including the data (e.g., data generated by steps S302 through S307) and the DM-RS (e.g., DM-RS determined based on equations 7 to 9 (i.e., DM-RS determined based on the Latin square matrix)) (S308). The base station may receive the uplink signal from the terminal without an uplink grant. Also, the base station may receive uplink signals from not only the terminal but also other terminals. That is, the base station may receive uplink signals from a plurality of terminals without uplink grants. The uplink signals may be transmitted from the plurality of terminals to the base station via non-orthogonal resources. Each of the uplink signals may include data (e.g., data generated by steps S302 through S307) and a DM-RS (e.g., a DM-RS determined based on equations 7 to 9 (i.e., DM-RS determined based on the Latin square matrix)).

The base station may estimate an uplink channel of each of the plurality of terminals based on the DM-RS included in each of the uplink signals (S309). Since the DM-RS included in each of the uplink signals is set based on the Latin square matrix, collision between DM-RSs may not occur in some intervals. Therefore, the base station can estimate the uplink channel of each of the plurality of terminals based on the DM-RS obtained in the interval in which no collision occurs.

The base station may obtain the data included in each of the uplink signals based on the estimated uplink channel (S310). Since the data included in the uplink signal is scrambled based on the terminal identifier (e.g., the unique signature), the base station may perform descrambling on the data included in the uplink signal based on the terminal identifier, and thus the descrambled data may be obtained. That is, since the descrambling procedure is performed using the unique signature of the terminal, the base station may distinguish the data included in the uplink signals received through the non-orthogonal resource.

The base station may obtain demodulated data by performing demodulation on the descrambled data. Since the data included in the uplink signal is interleaved based on the terminal identifier (e.g., the unique signature), the base station may perform deinterleaving on the demodulated data based on the terminal identifier, and the de-interleaved data may be obtained. That is, since the deinterleaving procedure is performed using the unique signature of the terminal, the base station may distinguish the data included in the uplink signals received through the non-orthogonal resource. The base station may obtain decoded data of each of the plurality of terminals by performing decoding on the de-interleaved data.

Meanwhile, a plurality of terminals may be classified into at least two groups, DM-RSs within each of the groups may be set to be orthogonal, and DM-RSs between the groups may be set to be non-orthogonal. Even when a DM-RS collision occurs between the groups, the base station may decode uplink signals (e.g., packet) by the channel coding and interference randomizing effect. However, when a collision range of DM-RSs is wide or when uplink transmissions of many groups are performed at the same time, a probability of occurrences of packet errors may be increased. Therefore, in order to improve a decoding success rate of packets at the base station, information indicating a possibility of DM-RS collision may be used.

Figure 12:
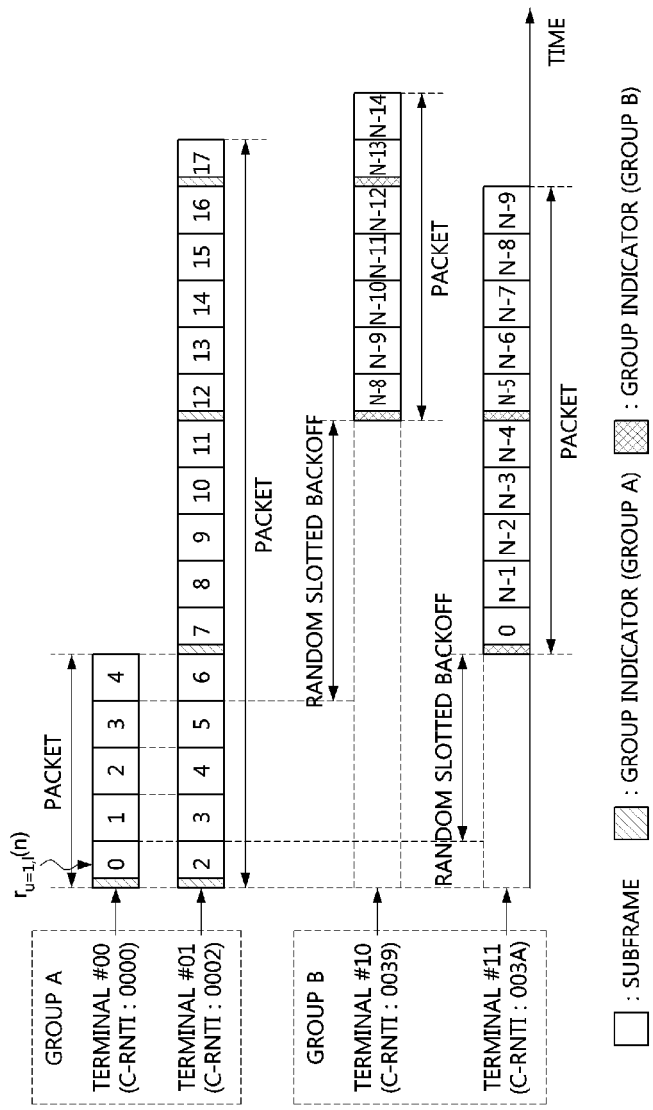
FIG. 12 is a conceptual diagram illustrating an embodiment of uplink transmission based on a group indicator.
Figure 13:
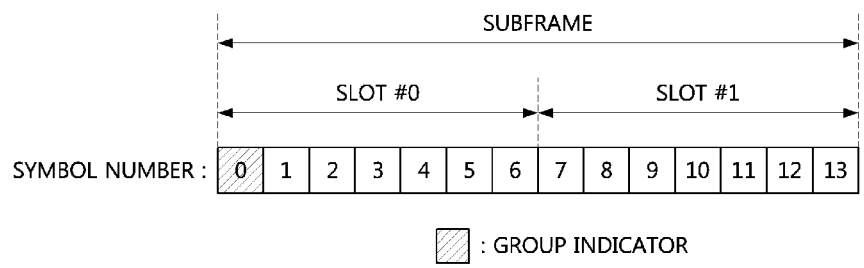
FIG. 13 is a conceptual diagram illustrating positions of a ground indicator in subframes.

FIG. 12 is a conceptual diagram illustrating an embodiment of uplink transmission based on a group indicator, and FIG. 13 is a conceptual diagram illustrating positions of a ground indicator in subframes.

Referring to FIGS. 12 and 13, each of terminals (e.g., a terminal #00, a terminal #01, a terminal #10, and a terminal #11) may generate an uplink signal including data, a DM-RS, and a group indicator (e.g., a group indicator of the DM-RS), and may transmit the generated uplink signal to the base station. That is, the uplink signal transmitted from the terminal to the base station may include not only the data and the DM-RS but also the group indicator. The group indicator may indicate a group (e.g., group A, group B, or the like) that performs uplink transmission (e. g., transmission of the DM-RS). The group indicator may be set differently for each group. For example, the terminals belonging to the group A (e.g., the terminal #00 and the terminal #01) may perform uplink transmission using the same group indicator. Also, the terminals belonging to the group B (e.g., the terminal #10 and the terminal #11) may perform uplink transmission using the same group indicator.

The group indicator may be located in the first symbol of the first subframe among consecutive subframes used for transmission of the uplink signal. Also, the group indicator may be set according to a predetermined interval (e.g., five subframes) in consecutive subframes used for transmission of the uplink signal. The group indicator may be a reference signal formed as a single tone. The reference signal used as the group indicator may be generated based on Equation 10 below.

$$x_n = \frac{1}{N_{FFT}} \sum_{k=0}^{N_{FFT}-1} X_k \cdot e^{j2\pi kn/N_{FFT}}, \quad \text{[Equation 10]}$$

$$n = 0, 1, 2, \ldots N_{FFT} - 1$$

Here, $x_n$ may be a reference signal used as the group indicator, and $X_k$ may be determined based on Equation 11 below. $N_{FFT}$ may indicate a size of fast Fourier transform (FFT).

$$X_k = 1, k = k_{sel}$$

$$X_k = 0, k \neq k_{sel}$$

$$k_{sel} = 4v + \lfloor u/11 \rfloor \quad \text{[Equation 11]}$$

In case that $k_{sel}$ is 2, $X_{k_{sel}=2} = \{0\ 0\ 1\ 0\ 0\ \ldots\ 0\}$ may be defined. $X_k$ may be set to all zeros except when k is two. If k is 2, a second sub-group may be set in the group.

Meanwhile, the base station may receive an uplink signal from a terminal and identify a group performing uplink transmission based on a group indicator included in the uplink signal. The base station may predict a DM-RS collision probability in the identified group, and may obtain a DM-RS from the uplink signal considering the predicted DM-RS collision probability. The base station may estimate an uplink channel between the base station and the terminal based on the DM-RS and obtain data included in the uplink signal based on the estimated uplink channel.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A non-orthogonal transmission method of a terminal in a communication system, the non-orthogonal transmission method comprising:
   generating data based on a signature used to identify the terminal among a plurality of terminals belonging to the communication system;
   generating an uplink signal including the data and a demodulation reference signal (DM-RS); and
   transmitting the uplink signal to a base station without an uplink grant;
   wherein the signature is a cell-radio network temporary identifier (C-RNTI) configured by the base station, and the data is interleaved using sequences configured based on the C-RNTI.

2. The non-orthogonal transmission method according to claim 1, wherein the sequences are four equal parts divided from the C-RNTI.

3. The non-orthogonal transmission method according to claim 1, wherein the data is scrambled using a sequence configured based on the C-RNTI.

4. The non-orthogonal transmission method according to claim 1, wherein a sequence of the DM-RS is determined based on the C-RNTI within a range determined based on a length of a Zadoff-Chu sequence and a number of DM-RS symbols spread in a subframe.

5. The non-orthogonal transmission method according to claim 1, wherein a sequence of the DM-RS is a sequence indicated by a row which is selected randomly from a Latin square matrix, and the Latin square matrix includes a plurality of sequences different from each other.

6. The non-orthogonal transmission method according to claim 1, wherein the plurality of terminals are classified into at least two groups, and the uplink signal further includes a group indicator indicating a group to which the terminal belongs.

7. The non-orthogonal transmission method according to claim 6, wherein the group indicator is located at a predetermined interval in consecutive subframes used for transmission of the uplink signal.

8. The non-orthogonal transmission method according to claim 6, wherein the group indicator is located in a first symbol of at least one subframe among consecutive subframes used for transmission of the uplink signal.

9. An operation method of a base station in a communication system, the operation method comprising:
receiving uplink signals from a plurality of terminals via a non-orthogonal resource without uplink grants;
identifying each of demodulation reference signals (DM-RSs) included in the uplink signals based on a signature of each of the plurality of terminals;
estimating an uplink channel of each of the plurality of terminals using each of the identified DM-RSs; and
obtaining data of each of the plurality of terminals from the uplink signals based on the estimated uplink channel;
wherein the signature is a cell-radio network temporary identifier (C-RNTI) configured by the base station, the data is obtained by performing a deinterleaving operation using sequences configured based on the C-RNTI.

10. The operation method according to claim 9, wherein the signature is a cell-radio network temporary identifier (C-RNTI) configured by the base station, and the data is further obtained by performing a descrambling operation using a sequence configured based on the C-RNTI.

11. The operation method according to claim 9, wherein the sequences are four equal parts divided from the C-RNTI.

12. The operation method according to claim 9, wherein the plurality of terminal are classified into at least two groups, and each of the uplink signals further includes a group indicator indicating a group to which each of the plurality of terminals belongs.

13. The operation method according to claim 12, wherein the group indicator is located at a predetermined interval in consecutive subframes used for transmission of each of the uplink signals.

14. The operation method according to claim 12, wherein the group indicator is located in a first symbol of at least one subframe among consecutive subframes used for transmission of each of the uplink signals.

15. A terminal supporting a non-orthogonal transmission, comprising a processor and a memory storing at least one instruction executed by the processor, wherein the at least one instruction is configured to:
generate data based on a signature used to identify the terminal among a plurality of terminals belonging to the communication system;
generate an uplink signal including the data and a demodulation reference signal (DM-RS); and
transmit the uplink signal to a base station without an uplink grant;
wherein the signature is a cell-radio network temporary identifier (C-RNTI) configured by the base station, and the data is interleaved using sequences configured based on the C-RNTI.

16. The terminal according to claim 15, wherein the sequences are four equal parts divided from the C-RNTI.

17. The terminal according to claim 15, wherein the data is scrambled using a sequence configured based on the C-RNTI.

18. The terminal according to claim 15, wherein the signature is a cell-radio network temporary identifier (C-RNTI) configured by the base station, and a sequence of the DM-RS is determined based on the C-RNTI within a range determined based on a length of a Zadoff-Chu sequence and a number of DM-RS symbols spread in a subframe.

19. The terminal according to claim 15, wherein the plurality of terminal are classified into at least two groups, and the uplink signal further includes a group indicator indicating a group to which the terminal belongs.

* * * * *